US009923392B2

(12) United States Patent
Weinstein et al.

(10) Patent No.: US 9,923,392 B2
(45) Date of Patent: Mar. 20, 2018

(54) POWER CHARGER WITH CHARGE INDICATING POWER BUTTON

(71) Applicants: Nathan Daniel Weinstein, Glastonbury, CT (US); Garold C. Miller, Glastonbury, CT (US)

(72) Inventors: Nathan Daniel Weinstein, Glastonbury, CT (US); Garold C. Miller, Glastonbury, CT (US)

(73) Assignee: HALO2CLOUD, LLC, Hartford, CT (US)

( * ) Notice: Subject to any disclaimer, the term of this patent is extended or adjusted under 35 U.S.C. 154(b) by 117 days.

(21) Appl. No.: 14/677,605

(22) Filed: Apr. 2, 2015

(65) Prior Publication Data
US 2015/0288205 A1    Oct. 8, 2015

Related U.S. Application Data

(60) Provisional application No. 61/974,691, filed on Apr. 3, 2014.

(51) Int. Cl.
| *H02J 7/00* | (2006.01) |
| *H02J 7/14* | (2006.01) |
| *H01M 10/46* | (2006.01) |
| *H01M 10/42* | (2006.01) |
| *H01M 10/44* | (2006.01) |

(52) U.S. Cl.
CPC ........... *H02J 7/0044* (2013.01); *H01M 10/46* (2013.01); *H02J 7/0027* (2013.01); *H01M 10/425* (2013.01); *H01M 10/44* (2013.01); *H02J 7/0042* (2013.01); *H02J 7/0045* (2013.01); *H02J 7/0052* (2013.01)

(58) Field of Classification Search
USPC ........ 320/107, 103, 114, 101, 115, 110, 111, 320/112, 128, 106, 160, 148; 307/150, 307/66
See application file for complete search history.

(56) References Cited

U.S. PATENT DOCUMENTS

| 6,259,228 B1 | 7/2001 | Becker et al. |
| 6,870,089 B1 | 3/2005 | Gray |
| 8,674,211 B1 | 3/2014 | Palmer et al. |
| 2005/0140331 A1* | 6/2005 | McQuade .............. A45C 15/00 320/101 |
| 2008/0029153 A1 | 2/2008 | Margalit |
| 2008/0079396 A1* | 4/2008 | Yamazaki .......... G06K 19/0702 320/128 |
| 2009/0021214 A1* | 1/2009 | Foster ................. H01M 10/465 320/114 |

(Continued)

*Primary Examiner* — Alexis Pacheco
(74) *Attorney, Agent, or Firm* — McCormick, Paulding & Huber LLP

(57) ABSTRACT

A power charger includes a case; a battery housed in the case; a power connection port housed in the case; a battery control module operatively connecting the battery with the power connection port; a power button operatively connected to actuate the battery control module between a first mode in which electrical current can flow from the battery to the power connection port, and a second mode in which electrical current can flow from the power connection port to the battery; and at least one LED operatively connected to be energized by the battery control module for illuminating the power button according to a battery charge level.

9 Claims, 6 Drawing Sheets

(56) References Cited

U.S. PATENT DOCUMENTS

| | | | |
|---|---|---|---|
| 2009/0224722 A1 | 9/2009 | Causey | |
| 2011/0018679 A1 | 1/2011 | Davis et al. | |
| 2011/0169451 A1* | 7/2011 | Stampfli | A45F 5/00 320/115 |
| 2011/0204843 A1* | 8/2011 | Foster | A45C 11/00 320/101 |
| 2012/0042996 A1 | 2/2012 | Glynn | |
| 2012/0043937 A1* | 2/2012 | Williams | H02J 7/0044 320/115 |
| 2012/0229071 A1* | 9/2012 | Schuessler | H01M 10/46 320/101 |
| 2012/0262116 A1* | 10/2012 | Ferber | H02J 7/0044 320/111 |
| 2012/0262117 A1* | 10/2012 | Ferber | H02J 7/0047 320/111 |
| 2012/0299528 A1* | 11/2012 | Scarmozzino | A45C 5/02 320/101 |
| 2013/0335003 A1* | 12/2013 | Buhler | H02J 7/0042 320/103 |
| 2014/0002004 A1* | 1/2014 | Farris-Gilbert | H02J 7/0027 320/103 |
| 2014/0167679 A1* | 6/2014 | Edwards | H02J 7/0044 320/103 |
| 2014/0274204 A1* | 9/2014 | Williams | H02J 7/0013 455/556.1 |
| 2014/0328076 A1* | 11/2014 | Firman, II | H01R 13/6675 362/511 |
| 2016/0006284 A1* | 1/2016 | Kljajic | H02J 7/0044 320/103 |

\* cited by examiner

POWER CHARGER WITH CHARGE INDICATING POWER BUTTON

CROSS REFERENCE TO RELATED APPLICATION

This application is a non-provisional of, claims the benefit under 35 USC § 119(e) of, and incorporates herein by reference U.S. Pat. App. 61/974,691 "Purse with Embedded Portable Power Charger" filed Apr. 3, 2014.

BACKGROUND

Technical Field

The invention relates to portable devices ("power chargers") that incorporate batteries for recharging the batteries of other portable devices. In general, a power charger includes an internal (optionally rechargeable) battery unit for connecting to and recharging one or more electronic device, as necessary, and at least one power connection port for connecting the charger unit with at least one electronic device, or an external power source, or both. Particular embodiments relate to means for efficiently indicating the charge levels of such portable devices. Particular embodiments relate to fashion accessories for efficiently transporting and accessing power chargers while protecting vulnerable contents from remote scanning.

Discussion of Art

Present day consumers typically own several electronic devices specifically designed for portability and use on-the-go, including, for example, a mobile phone or smart phone, a portable music player like an iPod® or an MP3 player, a tablet, a portable gaming unit, and the like. Each of these devices requires recharging. However, when such a device must be connected to an external (fixed location) power supply for recharging, it becomes difficult to make use of the recharging device in customary ambulatory manner, as the device has become tethered to the fixed location.

Additionally, different electronic devices may utilize distinct power connection ports or interfaces that are not mutually compatible with a single charging cable—e.g., USB®, Lightning®, or 30-pin Apple® connectors. Thus, a consumer may need to carry around several different charging cables and possibly different charging adapters.

Further, it may be the case that a portable device runs out of power in a location where no power source is readily available, or while its user is in transit between fixed locations. In such case a consumer may become unable to use the portable device until arriving at a different location where a power source is available.

On occasion, an electronic device needs a small amount of charge to finish a task before the device powers down due to insufficient battery capacity. For example, a user on a call using a mobile phone may wish to finish the call, but cannot find a power source to plug into, may not have enough time to get to a power source, or may not have the appropriate charging cable with her at the time. As noted, if the phone is plugged into a traditional power source, like a wall socket, it is difficult to continue using the phone as desired.

Accordingly, portable power chargers have been provided for on-the-go use. However, such power chargers often are inconvenient to transport. In particular, it is highly unlikely that a consumer will want to continuously hand-carry a power charger, as typical power chargers have a very industrial, technological look, and while they can be made more aesthetically pleasing by using different colors or decorative covers, they still have the general look of an electronic device. Thus, power chargers often are shoved into more convenient and/or more aesthetic carrying containers (a purse, backpack, pocket, or the like) in which they can become difficult to access. Indeed, given the typically unplanned and infrequent nature of using power chargers, it is likely that such devices will end up in the least-accessible regions of their carrying containers.

Moreover, further in consideration of the unplanned nature of using a power charger, the likely inaccessibility of a power charger except when a consumer immediately needs to use it, and the tendency of power chargers to "lose" battery charge over a period of weeks, it is possible that a power charger may be depleted of charge, without notice to a consumer, exactly at the time that the consumer needs to use it.

In view of the foregoing, there is a need for a charger that can be used to charge a variety of electronic devices, including but not limited to smart phones, mobile phones, data tablets, music players, cameras, camcorders, gaming units, e-books, Bluetooth® headsets and earpieces, GPS devices, and the like, either individually or simultaneously in various combinations, but also having an aesthetically pleasing appearance. Additionally, there is a need for such a charger that is portable, has a compact size, and is easy to use in various conditions and locations to charge one or more electronic devices simultaneously, including but not limited to in a house or office, a car or an airplane, as well as on-the-go, without compromising operation, performance or appearance. Further, there is a need for a combined charger and charging cable that is compact, lightweight and easy to transport without compromising its functionality for a user requiring a portable source of power. Still further, there is a need for a power charger that can be easily recharged from an external power source, providing increase flexibility and convenience of use for the power charger. Moreover, there is a need for a power charger that has an attractive external appearance and that can be easily carried in an accessible manner along with other useful objects.

Additionally, certain sorts of electronic devices or articles, typically carried in purses or wallets, increasingly are equipped with NFC (near field communication) or RFID (radio frequency identification) type technologies, which enable identification or even activation of these devices or articles ("vulnerable contents") without a consumer's knowledge. For example, both cell phones and credit cards can be equipped with this kind of technology. Indeed, the Mobil SpeedPass was one of the first exemplars of NFC technology. Although relatively convenient for tap-and-pay type transactions, this kind of technology can render consumers vulnerable to "digital pickpockets." Therefore, there is a need for protecting these sorts of vulnerable contents from pickpocketing.

SUMMARY OF INVENTION

In accordance with the present invention, a lightweight power charger is provided with a removably fitted and aesthetic covering that is usable as a purse, clutch, wallet, handbag or the like while maintaining the power charger in easy access for charging one or more electronic devices while also being usable as a fashion accessory.

Certain embodiments of the invention provide that the removably fitted covering also includes spaces for receiving credit cards, a mobile phone, or the like "vulnerable contents," and also incorporates RFID barrier material for preventing remote access to or detection of the vulnerable contents.

In one aspect of the present invention, the charger unit comprises a charger housing sized to fit into a purse, clutch, wallet, handbag, or the like, which provides protection to the charger and improves the aesthetic appearance of the power charger, permitting it to look and feel more like a fashion accessory than an electronic gadget. Indeed, a purse, clutch, wallet, handbag, or other type of portable fashion accessory can be designed to fit snugly around the charger housing, or include a pocket that receives the charger housing for on-the-go use. In alternate embodiments, a power charger in accordance with the present invention can be designed to fit within a pocket formed into a tote bag, duffel bag, backpack, luggage, or the like, whereby the location and positioning of the charger within said pocket does not interfere with use of the charger. In this regard, it is optimal that the charger can be used while it is embedded within a purse or bag and without requiring it to be removed prior to use.

The charger further includes a rechargeable battery unit disposed therein and operatively connected to at least one power connection port that can operate as either a power input (for providing an electrical charge from an external power source for recharging the internal battery unit when the charger unit is connected to the external power source) or a power output (for charging the internal batteries of other electronic devices from the rechargeable battery unit) or both.

In an embodiment of the present invention, the power charger includes a power input connector for connecting the internal battery unit to an external power source for recharging, as well as a power connection output port to which a charging cable can be attached to connect the power charger to one or more electronic devices in need of recharging from the internal battery unit. For example, the power input connector can be connected to the charger housing and in operative communication with the internal battery unit. When not in use, the power input connector can be stored within the purse, for example, in a pocket specifically designed to receive the connector. The pocket can be closed by a magnetic clasp, a zipper or other known means in the fashion accessory industry. Alternatively, the connector can be stored within a cavity formed in the charger housing. In use, the connector can be flexed away from the charger housing and connected to an external power source, either directly using an appropriate connection interface provided on the distal end of the connector, or using an adapter unit than can be connected to the distal end of the connector.

In a preferred design of the portable power charger, at least one removable and replaceable charging cable is also connected to the charger housing. The charging cable includes a first end adapted to connect to a power connection port of the power charger (e.g., the power connection port discussed above) and a second end adapted to connect to an electronic device for recharging from the internal battery of the power charger. When not in use, the charging cable can be stored within the charger housing and maintained within a desired footprint of the charger housing, or alternately, positioned adjacent the charger housing or the purse so that it is readily available when needed. In one embodiment, the charging cable can be stored against the purse, with the first end inserted within a storage cavity formed in the charger housing and the second end and intermediate cord portion disposed adjacent to the purse material, or within a pocket in the purse material, or within a storage cavity formed in the charger housing. The storage cavity for the first end of the charging cable can merely be an empty cavity shaped to snugly receive the first end and its connection interface, or alternatively, comprise a second power connection port with a connection interface that complements the interface on the first end. In use—that is, to recharge an electronic device—the second end of the cable can be flexed away from the charger housing for connection to an electronic device.

In preferred embodiments, the charging cable can be removed from the charger housing and replaced by another charging cable, as desired—for example, to change out the connection interface on the second end of the cable between a USB, micro-USB, mini-USB, 30-pin, Apple Lightning interface, or other type of connection interface, which provides flexibility in use. In alternate embodiments, the charging cable can be attached to the charger housing at the first end with the second end being stored in a storage cavity when not in use, but flexed away from the charger housing for use. Additional cables can also be provided—for example, for storage on the opposite side of the charger housing. Still further, additional power connection ports can be provided on the charger housing which can be used as a power connection input for recharging the internal battery unit of the charger, as a power connection output, for connection to additional electronic devices, as needed, or both.

The power connection port may also comprise means for indicating a charge level of the power charger. In certain embodiments, the connection port—for example, a standard USB port—is surrounded by a clear plastic housing or cage that can be illuminated by any of a plurality of LEDs (e.g., to light up red, yellow, or green). The LEDs will illuminate the clear plastic housing to indicate the level of charge remaining in the internal battery unit. For example: a green illumination indicates a battery level between about 67% and about 100%; a yellow illumination indicates a battery level between about 34% and about 66%; a red illumination indicates a battery level of between about 0% and about 33%. The LEDs may also be actuated to indicate charging status, e.g., flashing or blinking illumination at a first periodicity may indicate the power charger is being charged whereas flashing or blinking illumination at a different periodicity may indicate the power charger is discharging.

In another aspect of the present invention, the power connection port housing can also act as a power button. For example, the clear plastic housing can be operatively connected to a power switch, which is activated when a cable is inserted into the power connection port. Similarly, the power charger can turn off when the charging cable is removed from the power connection port. In alternate embodiments, the power charger can include an internal timer that turns off the charger at a predetermined time, or when nothing is attached to the charger to drawn power form the internal battery unit. In other embodiments, the power switch can be a toggle type switch, such that inserting a cable into the power connection port toggles the power switch on, and depressing the power connection port housing (in order to remove the cable) toggles the power switch off. For example, the power switch may need to be actuated by the power connection port housing for a specific period of time, e.g., in excess of one second to in excess of three seconds, in order to toggle the power switch off.

Thus, embodiments of the invention provide a power charger that includes a case; a battery housed in the case; a power connection port housed in the case; a battery control module operatively connecting the battery with the power connection port; a power button operatively connected to actuate the battery control module between a first mode in which electrical current can flow from the battery to the power connection port, and a second mode in which electrical current can flow from the power connection port to the battery; and at least one LED operatively connected to be energized by the battery control module for illuminating the power button according to a battery charge level.

In alternate embodiments, additional charging cables and power connection ports can be provided within detracting from the spirit or principles of the present invention.

In another aspect of the present invention, the power charger can be embedded within a pouch which can then, in turn, be embedded within a fashion accessory, such as a purse, clutch, wallet, handbag, or the like. In this regard, the outer bag would permit easy removal of the pouch if the power charger was needed separate from the outer bag. The pouch permits charging cables to protrude through the pouch to permit charging of the internal battery unit and recharging of electronic devices connected to the power charger.

In accordance with the present invention, a lightweight power charger is provided with The varied exemplary embodiments of the invention, as briefly described above, are illustrated by certain of the following figures.

DETAILED DESCRIPTION

Figure 1:
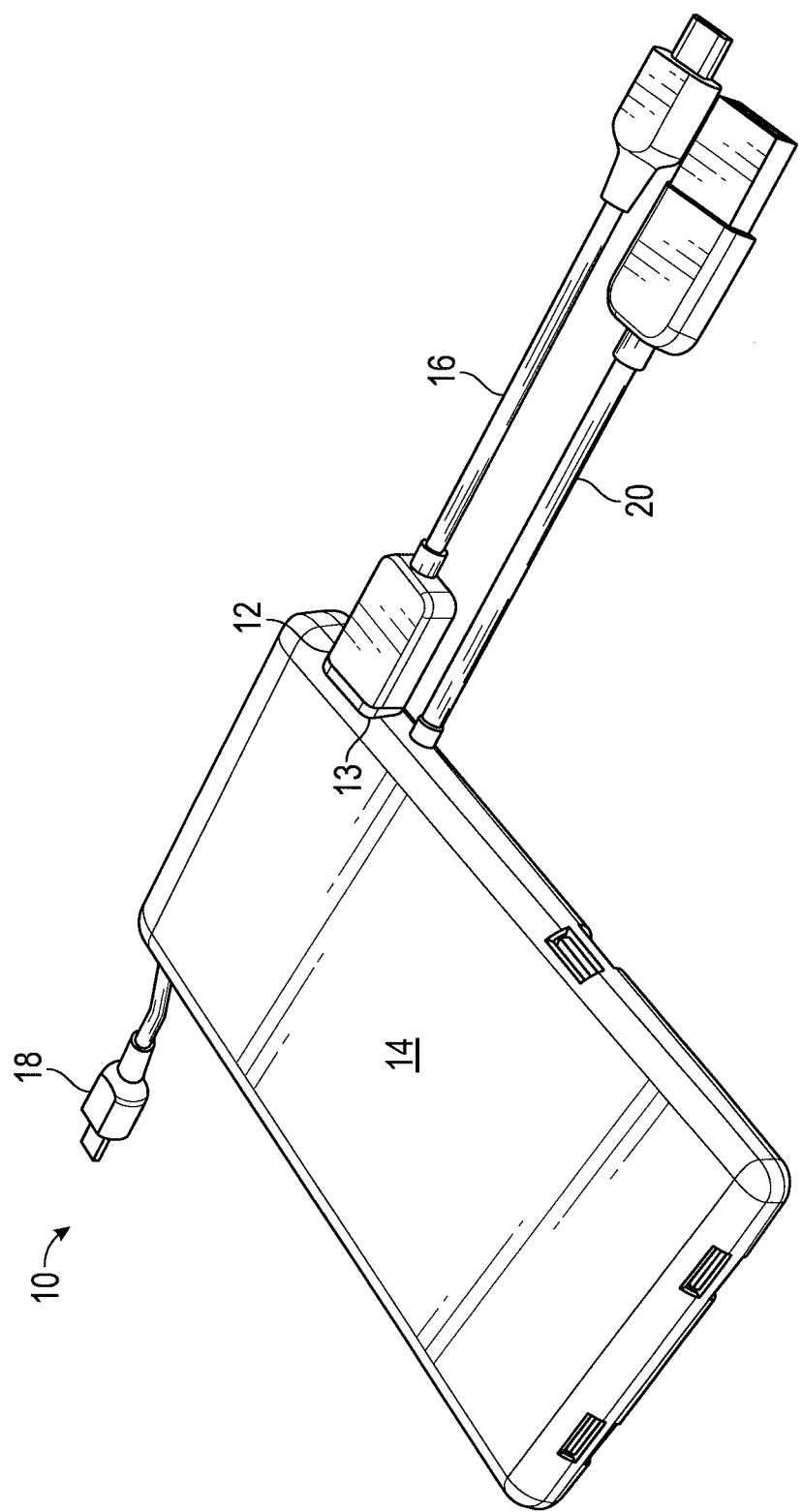
FIGS. 1 and 2 depict in perspective views a power charger that includes a charge indicating power button, according to an embodiment of the invention.

Although embodiments of the invention are shown in the drawings and are described as relating specifically to portable power chargers enclosed in fashion accessories, aspects of the invention may be applicable to, e.g., power supply devices generally.

Figure 2:
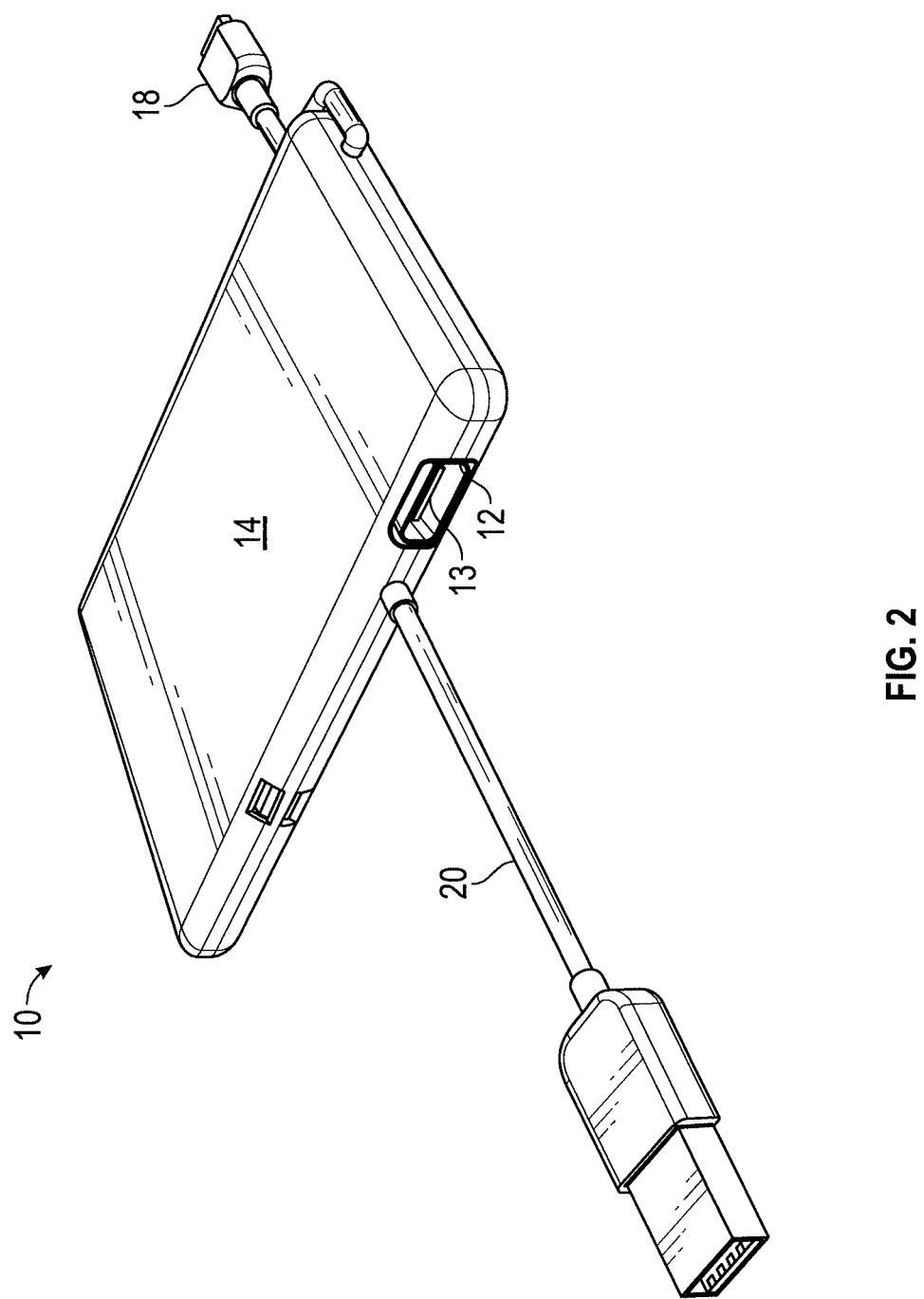

FIGS. 1 and 2 depict in perspective views a power charger 10 that includes a charge indicating power button 12, according to an embodiment of the invention. The power button 12 houses a charging port 13 (e.g., a standard female USB port), and is mounted in a case 14, which includes connections for power cables 16 (the charging port 13), 18, and 20. The power button 12 typically is manufactured of a translucent or transparent polymer, e.g., PET, acrylic, polycarbonate, HDPE. It can be cast or machined. The case 14 typically also is manufactured of a polymer, and typically is injection molded as two pieces that are split along a midplane. The cables 16, 18, 20 are commercially available with different connecting ends. The cable 16 typically has one end standard male USB, for plugging into the standard female USB port 13. The power button 12 may be configured around the power connection port 13, such that plugging in the cable 16 will cause the power button 12 to be depressed against a light spring (not shown), thereby actuating an internal switch (shown in FIG. 3) so as to deliver power from a battery to the power connection port 13. The cables 18 and 20 may be integrally attached into the case 14, as shown for example in FIGS. 1-3. Alternatively, one or both of the cables 18 and 20 may also be detachable like the cable 16, as shown for example in FIGS. 4 and 5. In case the cable(s) 18 and/or 20 are detachable from the power charger 10, they may be provided with differing ends, e.g., each may have a micro-USB end, a standard USB end, or another commonly used plug for connecting to the power charger 10 and a different plug end such as micro-USB, Lightning®, or 30-pin for connecting to a portable device to be charged from the power charger 10. Other plug ends are known or will become known to ordinary skilled workers, and are not excepted from the scope of the invention although not expressly listed.

Figure 3:
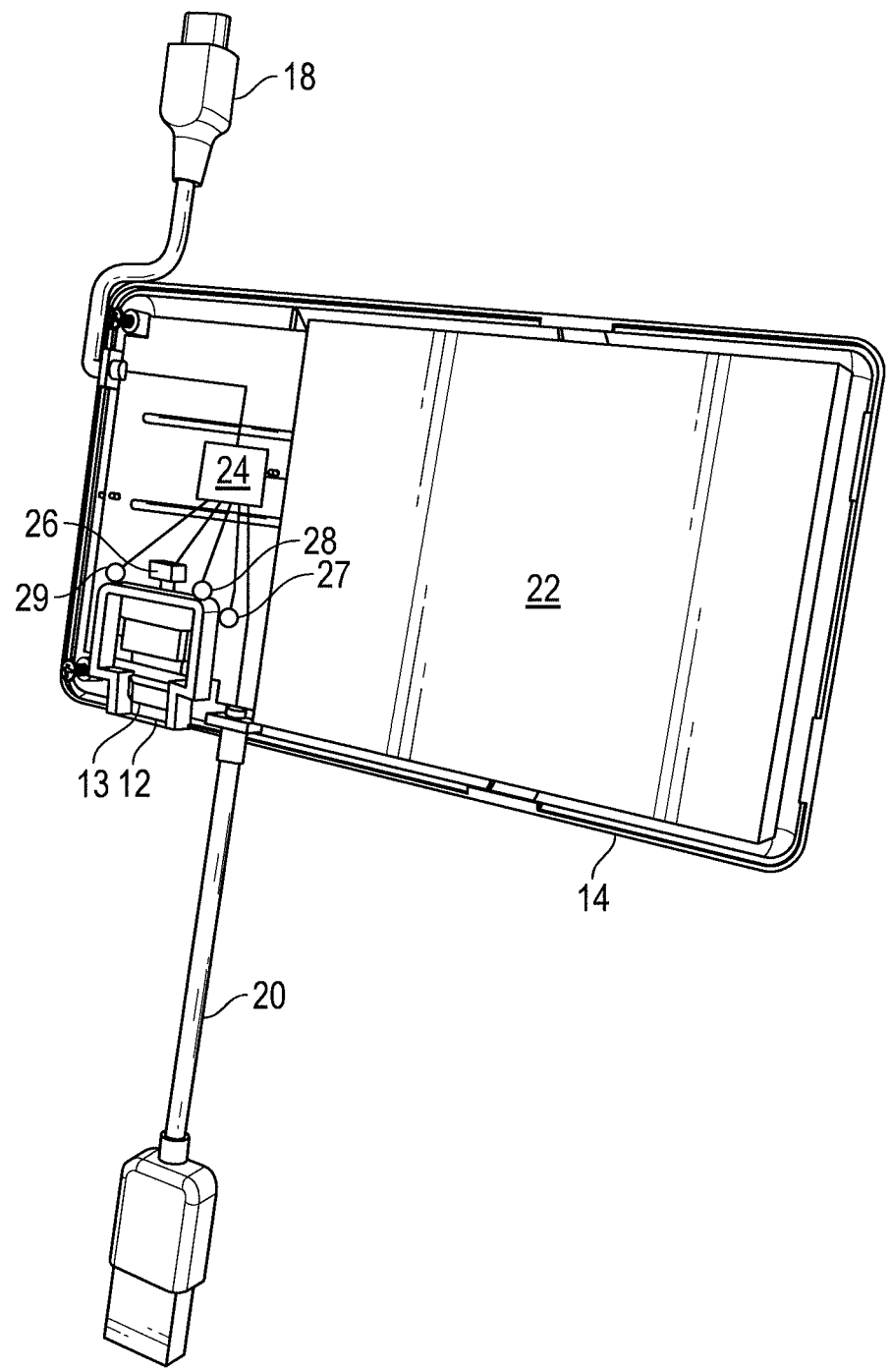
FIG. 3 shows in cutaway perspective view internal components of the power charger of FIGS. 1 and 2.

Referring to FIG. 3, it can be seen that the case 14 can be assembled of two injection-molded halves that are fastened across a midplane by screws, pegs, or similar mechanical fasteners; or, alternatively, by friction welding, ultrasonic welding, epoxy or other adhesives. The case 14 houses a battery 22 as well as a battery control module 24. The battery control module 24 operatively connects the battery 22 with the power connection port 13, the cable 18, and the cable 20, as well as with the internal switch 26 and with at least one LED (in certain embodiments, at least three LEDs of differing colors 27, 28, 29). The power button 12 can be configured as a cage around the power connection port 13, such that pushing the power button inward will actuate the internal switch 26. The internal switch 26 may be a spring-return switch, and may operate with the battery control module 24 either as a normally-off switch (i.e. the battery control module will permit discharge of the battery 22 via the power connection port 13 and/or either of the cables 18, 20 only when the internal switch 26 is actuated by the power button 12) or as a toggle switch (i.e. the battery control module 24 will permit discharge of the battery 22 in response to the internal switch being actuated, and will continue to permit discharge of the battery 22 until the internal switch is again actuated). In certain embodiments of the invention, the battery control module 24 may be configured to require a specific actuation of the internal switch 26 in order to interrupt discharge of the battery 22. For example, the battery control module 24 may be configured to require that the internal switch 26 is actuated for at least a set period of time, e.g., more than about one second, or more than about three seconds, so as to interrupt discharge of the battery 22.

The battery control module 24 also can be configured to illuminate the LED or LEDs 27, 28, 29 in response to actuation of the internal switch 26. For example, the battery control module 24 can be configured to illuminate one or more of the LEDs 27, 28, 29 while power is delivered from the battery 22 to any of the power connection port 13, the cable 18, and/or the cable 20.

For example, the power charger 10 may include only a green LED 27 and a red LED 28. Then during discharge of the battery 22, the battery control module 24 can illuminate the translucent or transparent power button 12 by only the green LED 27 in case the battery control module monitors a charge level of the battery 22 that is between about 67% and about 100%; can illuminate the power button by both the green LED 27 and the red LED 28 (to provide a yellow or amber light) in case of a charge level of the battery 22 between about 34% and about 66%; or can illuminate the power button 12 by only the red LED 28 in case of a battery charge level of between about 0% and about 33%.

In other embodiments, the power charger 10 may include only the green (or any other single color) LED 27, in which case, the battery control module 24 can be configured to illuminate the green LED 27 (or any other color of LED) when the internal switch 26 is actuated, at a (blinking) duty cycle corresponding to a charge level of the battery 22. In other words, the green LED 27 is constant on at 100% battery charge, and blinks less frequently as the battery charge level depletes—e.g., 50% duty cycle at 50% battery level, 20% duty cycle at 20% battery level.

In yet other embodiments, the power charger 10 may include green, red, and yellow LEDs 27, 28, 29. In such embodiments, the battery control module 24 can illuminate the translucent or transparent power button 12 by only the green LED 27 in case the battery control module monitors a charge level of the battery 22 that is between about 67% and about 100%; can illuminate the power button by only the yellow LED 29 in case of a charge level of the battery 22 between about 34% and about 66%; or can illuminate the power button 12 by only the red LED 28 in case of a battery charge level of between about 0% and about 33%.

In any embodiment, the battery control module 24 can cause one or more of the LED(s) to blink while charging the battery 22 from an external supply.

Figure 4:
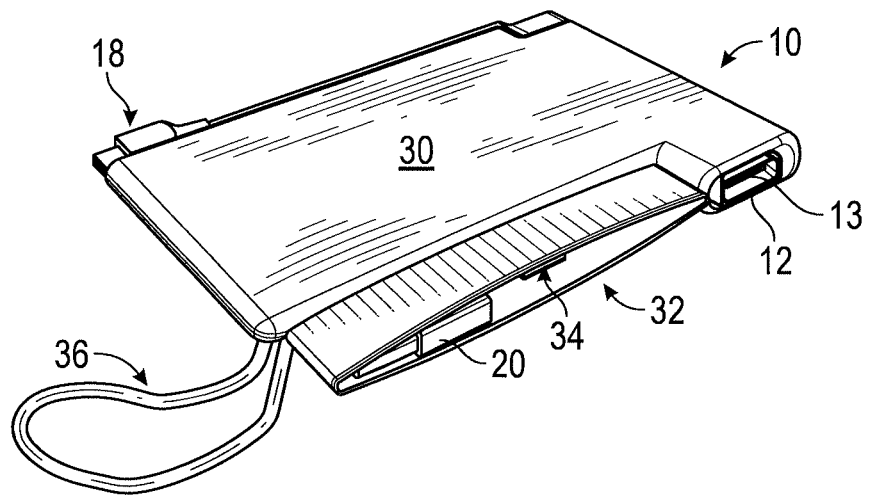
FIGS. 4 and 5 depict in perspective views a wristlet pouch that houses the power charger of FIGS. 1 and 2, according to another embodiment of the invention.
Figure 5:
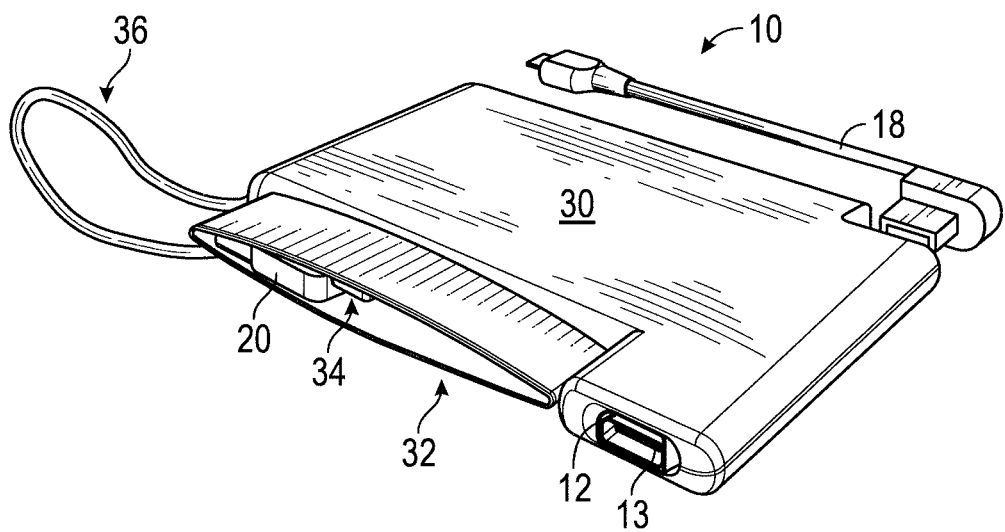

Referring now to FIGS. 4-5, the power charger 10 can be housed inside a wristlet pouch 30. The pouch 30 can be fabricated of leather, plastic, or cloth, and can be glued to the external surfaces of the case 14, can be stitched to closely wrap the case 14, or can be fashioned with a main pocket that closely fits the case 14 while providing an auxiliary pocket for stowage of a cell phone, one or more identity cards, cash, or the like contents. In select embodiments, the pouch 30 includes a layer of RFID barrier material, which protects vulnerable contents from remote access or scanning. The pouch 30 has a main opening 32, through which at least the cable 20 is visible and directly accessible. Any auxiliary pocket of the pouch 30 also can be accessed via the opening 32, which includes magnetic clasps 34 for securing the opening so as to establish the RFID barrier material completely enclosing any vulnerable contents. The pouch 30 also includes a wrist strap 36 for ease of carriage. The pouch 30 can be fabricated specifically of any aesthetic material, e.g., patterned woven or non-woven fabric, quality leather, or attractively patterned plastic. The power button 12 and the power connection port 13 are directly accessible and visible through a dedicated opening of the pouch 30, separate from the main opening 32. In certain embodiments the dedicated opening may be snugly fitted around the case 14, adjacent the power button 12, as shown in FIGS. 4-5. Also as shown in FIGS. 4-5, the pouch 30 can include another dedicated opening, snugly fitted around the case 14, for direct access of the cable 18 to the case 14. The cable 18 may be formed to remain close to the outer surface of the pouch 30, for example by including a right-angle connector as shown in FIG. 5. Also as shown in FIG. 5, the cable 18 can be configured to be detachable from the case 14, for example so that when not in use the cable 18 can be stowed within the main opening 32 of the pouch 30.

Figure 6:
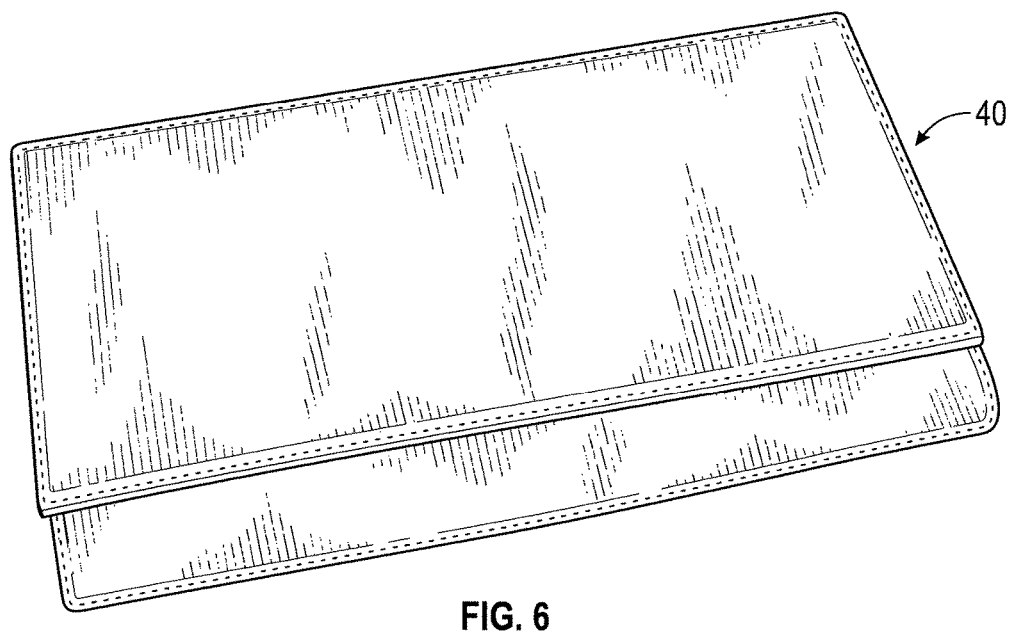
FIGS. 6 and 7 show in perspective views a wallet that houses the power charger of FIGS. 1 and 2, according to another embodiment of the invention.
Figure 7:
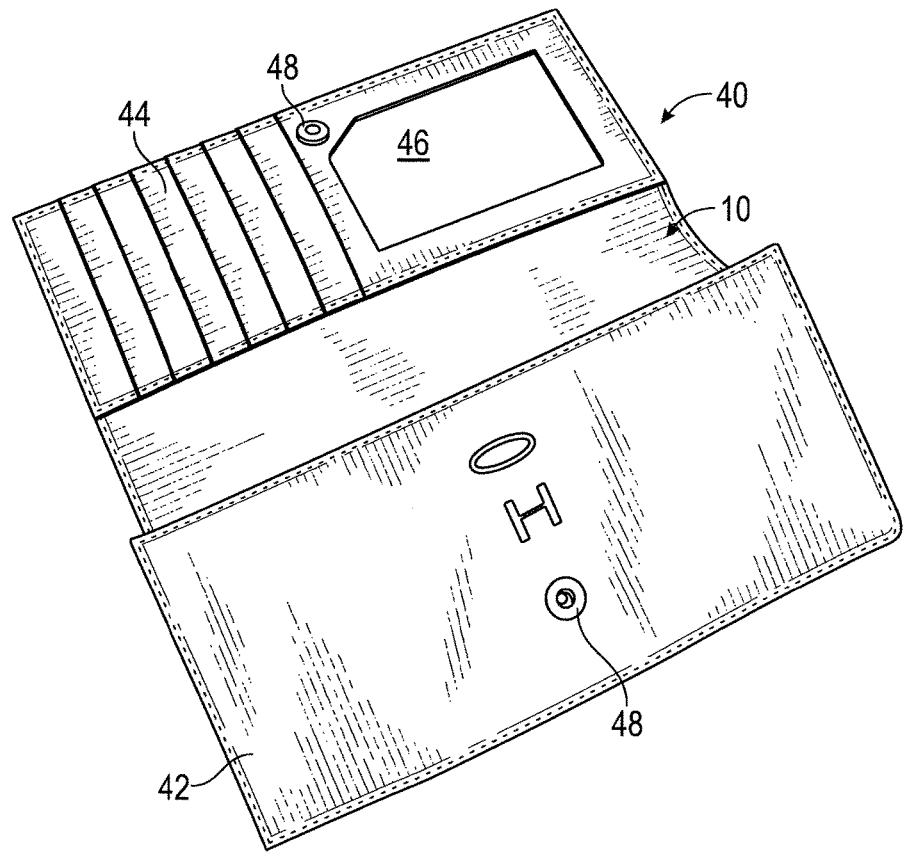

FIGS. 6-7 show in perspective views a wallet 40 in which the power charger 10 can be carried. The wallet 40 contains a fitted compartment or pouch 42, into which the power charger 10 can be inserted, as well as a flap 44 for closing the pouch 42. The flap 44, as shown, includes a window that defines a card pocket 46. The flap 44 has a snap closure 48. The pouch 42 is constructed to hold the power charger 10 such that at least the power button 12, the power connection 13, and the cable 20 are directly accessible and visible simply by opening the flap 44.

Figure 8:
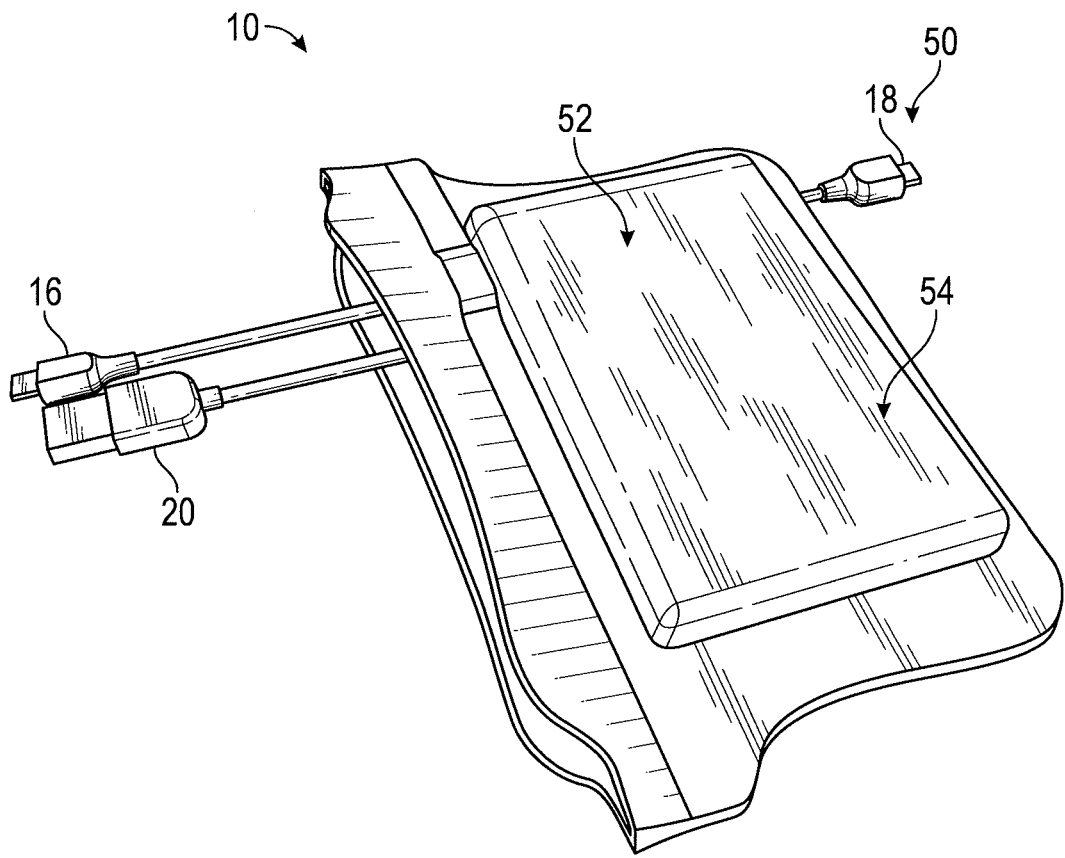
FIG. 8 depicts in perspective view a clutch that houses the power charger of FIGS. 1 and 2, according to another embodiment of the invention.

FIG. 8 depicts in perspective view a clutch 50 that contains a fitted compartment or pouch 52 in which the power charger 10 is held. The pouch 52 is configured such that at least the power button 12, the power connection 13, and the cable 20 are directly accessible and visible by opening the clutch 50. The clutch 50 also contains a main pocket 54, in which various content (including vulnerable content) can be stowed. At least the main pocket 54 is lined with an RFID barrier material. The clutch 50 can be closed with magnetic clasps as shown in FIGS. 4-5, or with one or more snaps as shown in FIGS. 6-7.

Exemplary embodiments of the invention have been described with reference to attached drawings. Those skilled in the art will apprehend variations in form or detail that are consistent with the scope of the invention as defined by the appended claims.

What is claimed is:

1. A power charger article comprising:
   a case;
   a battery housed in the case;
   a power connection port housed in the case;
   a battery control module operatively connecting the battery with the power connection port;
   a switch operatively connected to actuate the battery control module between a first mode in which electrical current can flow from the battery to the power connection port, and a second mode in which electrical current can flow from the power connection port to the battery;
   a translucent or transparent cage defining an outer edge of the power connection port;
   wherein the cage is mounted within an opening in a side of the case that is sized to receive the cage;
   wherein the cage is operatively connected as a power button that is mechanically operable to actuate the switch; and
   at least one LED operatively connected to be energized by the battery control module, and positioned to illuminate the cage of the power connection port when energized by the battery control module.

2. The article of claim 1 wherein the switch and the battery control module are mutually configured so that the power button acts as a toggle button, with a first actuation of the switch causing the battery control module to enter the first mode and with a second actuation of the switch causing the battery control module to enter the second mode.

3. The article of claim 1 wherein the switch and the battery control module are mutually configured so that the power button acts as a press-and-hold button, with actuation of the switch causing the battery control module to enter the first mode and with release of the switch causing the battery control module to enter the second mode.

4. The article of claim 1 wherein the at least one LED includes a first LED of a first color and a second LED of a second color, the battery control module is configured to monitor a level of battery charge and to energize only the first LED in response to the level of battery charge within a first range, to energize the first LED and the second LED together in response to the level of battery charge within a second range, and to energize only the second LED in response to the level of battery charge within a third range.

5. The article of claim 4 wherein the first range is from about 66% to about 100%, the second range is from about 33% to about 66%, and the third range is from about 0% to about 33%.

6. The article of claim 1 wherein the at least one LED includes a first LED of a first color, a second LED of a second color, and a third LED of a third color, the battery control module is configured to monitor a level of battery charge and to energize only the first LED in response to the level of battery charge within a first range, to energize only the second LED in response to the level of battery charge within a second range, and to energize only the third LED in response to the level of battery charge within a third range.

7. The article of claim 6 wherein the first range is from about 66% to about 100%, the second range is from about 33% to about 66%, and the third range is from about 0% to about 33%.

8. The article of claim 1 wherein the opening of the cage permits insertion of a cable into the power connection port.

9. The article of claim 8 wherein the opening of the cage is shaped such that insertion of a standard USB plug into the power connection port causes the cage to move into the case, thereby actuating the switch, and to remain at its inward position until the standard USB plug is removed from the power connection port.

\* \* \* \* \*